United States Patent
Kuz et al.

(10) Patent No.: US 7,953,871 B2
(45) Date of Patent: May 31, 2011

(54) SECURE NETWORKED SYSTEM FOR CONTROLLING MOBILE ACCESS TO ENCRYPTED DATA SERVICES

(75) Inventors: Volker Kuz, Braunschweig (DE); Ralph Behrens, Schellerten (DE); Grit Behrens, Schellerten (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1647 days.

(21) Appl. No.: 10/984,731

(22) Filed: Nov. 8, 2004

(65) Prior Publication Data

US 2005/0154795 A1 Jul. 14, 2005

(30) Foreign Application Priority Data

Nov. 7, 2003 (EP) .................................. 03025679

(51) Int. Cl.
*G06F 15/16* (2006.01)
(52) U.S. Cl. ............. 709/229; 709/203; 709/200; 726/3
(58) Field of Classification Search .................. 709/203, 709/229, 200; 380/247, 258, 229; 726/2, 726/3
See application file for complete search history.

(56) References Cited

U.S. PATENT DOCUMENTS

| | | | | |
|---|---|---|---|---|
| 6,036,090 | A * | 3/2000 | Rahman et al. | 235/380 |
| 6,212,182 | B1 * | 4/2001 | McKeown | 370/390 |
| 6,490,356 | B1 * | 12/2002 | Beuque | 380/239 |
| 6,735,672 | B2 * | 5/2004 | Nishikawa et al. | 711/114 |
| 6,980,660 | B1 * | 12/2005 | Hind et al. | 380/282 |
| 2002/0059614 | A1 | 5/2002 | Lipsanen et al. | 725/75 |
| 2003/0037097 | A1 * | 2/2003 | Meyer et al. | 709/202 |
| 2003/0061512 | A1 * | 3/2003 | Flurry et al. | 713/201 |
| 2003/0200184 | A1 * | 10/2003 | Dominguez et al. | 705/78 |

FOREIGN PATENT DOCUMENTS

| EP | 1 209 928 A2 | 5/2002 |
|---|---|---|
| WO | WO 00/48375 | 8/2000 |

OTHER PUBLICATIONS

DaimlerChrysler, Sun Microsystems: IT Cruiser Telematics Concept, XP-002271676, Jan. 2001, pp. 1-11.
European Patent Office Search Report regarding Application No. EP 03 02 5679, dated Feb. 27, 2004, p. 1-3.
3GPP TR 23.846 6.10 (Dec. 2002) Technical Report, XP-002271675, 3rd Generation Partnership Project; Technical Specification Group Services and System Aspects; Multimedia Broadcast/Multicast Service (MBMS); Architecture and functional description (Release 6), Dec. 2000, pp. 1-31.
Sun Microsystems: Netscape Certificate Management System Installation and Deployment Guide, Chapter 1 Introduction to Certificate Management System, XP-002271674, dated 2000, pp. 1-35.

* cited by examiner

*Primary Examiner* — Ario Etienne
*Assistant Examiner* — El Hadji Sall

(57) ABSTRACT

A networked system for controlling the mobile access to a data service, which may provide encrypted data, is presented. The system may include a mobile device and a mobile access control server, which controls the mobile device's access to the data service by controlling the access information required to access the data service. The system may also include a content server that provides the data service, a certification authority, and a network for enabling communication among the components of the system. To access encrypted data services, the mobile device communicates an access request to the mobile access control server, which determines whether access should be granted, and provides access information to the mobile device, enabling the mobile device to establish encrypted communication with the content server and/or to decrypt the encrypted data provided by the data service via the content server.

21 Claims, 11 Drawing Sheets

SECURE NETWORKED SYSTEM FOR CONTROLLING MOBILE ACCESS TO ENCRYPTED DATA SERVICES

PRIORITY CLAIM

This application claims priority based on European Patent Application number 03025679.6, filed Nov. 7, 2003. The disclosure of the above application is incorporated herein by reference.

BACKGROUND OF THE INVENTION

1. Technical Field

The present invention relates to providing secure access to data services for mobile devices.

2. Related Art

The Internet is an open system in which the identity of communicating users is not easy to determine and authenticate. Further, the communication channel is non-physical and therefore is vulnerable to eavesdropping and active interference. Thus, communicating over the Internet is much like communicating with anonymous postcards, which are open for anyone to read, or even alter.

The Internet may be used to carry messages between specific endpoints in a relatively secure and private way by using encryption. However, problems may still arise, for example, from a "man-in-the-middle" attack made to gain knowledge over data, or to gain access to data and resources. It is important to note that these problems do not disappear with encryption or even use of a secure protocol. If a user is led to connect with a site that only appears to be the desired site (a "spoofing site"), a secure connection made with this site will provide no protection. Thus, identity certification, or authentication, is needed to assure that communication is between the desired users.

The ITU-T Recommendation X.509 (the "X.509 standard"), which has been implemented as a de facto standard, defines a framework for providing authentication services under a central control paradigm represented by a directory. The X.509 standard describes two levels of authentication. The first, referred to as "simple authentication," uses a password to verify claimed identity. The second, referred to as "strong authentication," involves credentials that are formed using cryptographic techniques (a "certificate").

A certificate, also known as a user certificate or public key certificate, includes the public keys of a user, and other information, which are rendered unforgeable by encipherment with the private key issued by a certification authority ("CA"). The certificate allows an association between a name for the user (a "unique distinguished name" or "DN"), and the user's public-key. The DN is denoted by a naming authority ("NA") and accepted by a CA as unique within the CA's domain. The CA and the NA may be the same entity. The same user may have different DNs in different CAs. Alternately, the user may have the same DN in different CAs, even if a different user has already used the same DN in a CA. Therefore, different DNs in different CAs do not necessarily correspond to different users and vice-versa. Further, a DN does not have to contain the user's actual name or location. Thus, semantically, the CA certificate refers to a name; however, the certificate does not denote the name.

The X.509 standard focuses on defining a mechanism by which information can be made available to a user in a secure way. However, the X.509 standard is not meant to address the level of effort required to validate the information in a certificate, or define a global meaning to that information outside the CA's management acts. The main purpose of a CA is to bind a public key to the name contained in the certificate, and thus assure users that some measure of care was taken to ensure that this binding is valid for both the name and key. However, whether a user's DN actually corresponds to identity credentials that are linked to a person or to an e-mail address, and how such a link is verified is outside the scope of the X.509 standard. The resolution of these issues depends on each CA's self-defined rules, called CPS.

The Secure Sockets Layer ("SSL") and hypertext transfer protocol over secure socket layer ("HTTP over SSL" or "HTTPS") are protocols that support the use of digital certificates issued from a server under the X.509 standard ("X.509 certificates"). If necessary, a user can use the certificate to authenticate a sender. SSL is commonly-used for managing the security of message transmission over the Internet (see Freier et al, "The SSL protocol version 3.0," Internet Draft, Nov. 18, 1996, available at http://www.ietf.org). SSL may provide a framework for defining an authentication procedure for users (the communication endpoints), and procedures for establishing encrypted communication between users. SSL uses a program layer located between the Internet's Hypertext Transfer Protocol ("HTTP") and Transport Control Protocol ("TCP") layers.

SSL is included as part of both the MICROSOFT® and NETSCAPE® browsers and most Web server products. Developed by NETSCAPE®, SSL also gained the support of MICROSOFT® and other Internet client/server developers and became the de facto standard until evolving into Transport Layer Security ("TLS"), which is based on SSL. The "sockets" in Secure Socket Layer refers to the sockets method of passing data back and forth between a client and a server program in a network, or between program layers in the same computer. SSL uses the public-and-private key encryption system by RSA (Rivest, Shamir and Adleman), which also uses digital certificates. TLS and SSL are an integral part of most Web browsers ("clients") and Web servers. If a Web site is on a server that supports SSL and SSL is enabled, specific Web pages may be identified as requiring SSL access. Any Web server may be enabled by using NETSCAPE®'s SSL-Ref program library, which may be downloaded for commercial or noncommercial use.

HTTPS is a Web protocol developed by NETSCAPE® and built into the NETSCAPE® Web browser, which encrypts and decrypts user page requests and the Web pages that are returned by the Web server. HTTPS uses NETSCAPE®'s SSL as a sublayer under NETSCAPE®'s regular HTTP application layering, in which HTTPS may use port 443 instead of HTTP port 80 in its interactions with the lower layer, TCP/IP. SSL may use a 40-bit key size for the RC4 stream encryption algorithm, which may be considered an adequate degree of encryption for commercial communications.

Due to increasing available bandwidth for wireless communication, mobile users may gain access to the Internet and other data services with mobile devices. These mobile devices may integrate devices that provide various functions. For example, a mobile device for use in a vehicle may include a receiver for providing entertainment and a navigation system for providing trip planning. However, in using mobile devices to wirelessly access data services, security has become an issue. Protocols, such as the wireless application protocol ("WAP"), enable the users of mobile devices (such as devices that include integrated receivers) to gain access to Internet content. Access is gained, however, in a rather functionally reduced manner as compared to the access enabled by browsers on desktop computers. The browsers on desktop computers may use HTTP, Macromedia Flash, Java, JScript, and the like, for animating web page content and enabling enhanced navigation on web pages.

SUMMARY

As more sophisticated access methods and broadband access via wireless links become standard, users demand more sophisticated products and applications that provide access to data or broadcast services while the users are moving in a manner similar to that provided by stationary desktop computers. Therefore, employing, for example, the X.509 standard and SSL in mobile devices to secure communications and data may be desirable. In addition, controlling access to particular data or broadcast services by mobile devices may also be desirable. In addition, because mobile devices may frequently change their location, and perhaps the access point through which they access the services, access control that is independent of the location of such mobile devices or the access point through which such mobile devices access the services may be desired.

This document describes a server for controlling mobile access (a "mobile access control server"), a mobile device, and a secure networked system that may include, alone or in any combination, methods, systems and/or devices for providing control of mobile access to a data service. The data service may include any type of service providing data in a wireless manner. For example, the data service may be a broadcast service, such as digital radio or video. The networked system may include a mobile access control server, and may also include one or more mobile devices, and a content server. The content server may provide the data service using data in encrypted form. In general, the mobile device, which may be portable or fixed within a mobile body, such as a vehicle, may provide access to the data service. For example, the mobile device may include a browser application that provides such access. In addition, the mobile device may provide functions such as entertainment and information processing. The networked system may also include a network that enables the other components of the networked system to be in communication with each other.

In use, the mobile device may make a request to the mobile access control server for access to the data service (an "access request"). This request may indicate the particular data service to which access is requested, and/or an identifier of the mobile device making the request. Upon receiving the access request, the mobile access control server may determine whether the mobile device is allowed to access the requested data service. The mobile access control server may make this determination based on the identifier supplied by the mobile device in an access request.

If the access control service determines that the mobile device is not allowed to access the data server, the mobile access control server may initiate a subscription process that enables the mobile device to subscribe to the requested data service.

If, however the mobile access control server determines that the mobile device is allowed to access the requested data service, the mobile access control server may provide information relating to the content server providing the requested data service (the "access information") to the mobile device. The access information may include a certificate, such as an X.509 certificate. Alternately, or in addition, the access information may include a session key that enables the mobile device to decrypt the encrypted data service. Before providing the access information to the mobile device, the mobile access control server may determine whether the access information is stored within the mobile access control server. If the access information is not stored within the mobile access control server, the mobile access control server may request the access information from the content server or a certificate authority. The mobile access control server may then receive and store the access information.

The mobile access control server may then communicate the access information to the mobile device via the network and perhaps through an access provider. Alternately, the mobile access control server may provide a message to the mobile device indicating a location within the mobile access control server from which the access information may be obtained by the mobile device. Upon receiving such a message, the mobile device may request the access information in the location indicated in the message. In turn, the mobile access control server may communicate the access information to the mobile device, which may store the access information for current and/or later use.

The mobile device may use the access information to establish an encrypted connection (or a "session," for example when made within HTTPS) to the content server or to decrypt encrypted data communicated with the data service via the content server. Further, when trying to receive an encoded data service, such as an audio or video broadcast service, from a content server, the mobile device may only be capable of receiving and decoding the data that is provided with the correct session key. Hence, the access to data services may be controlled by a mobile access control server by only providing the mobile device with the necessary access information for successfully receiving the requested data service, if the mobile device is granted access to the service by the mobile access control server. This access control mechanism is also independent from the point of access of the mobile device to the network.

Prior to making an access request to the mobile access control server, the mobile device may determine whether the access information is stored in the mobile device itself. If the access information is stored in the mobile device, for example as the result of a previous access request, the mobile device may establish an encrypted connection to the content server or decrypt encrypted data provided by the data service via the content server using the stored access information.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION OF THE PREFERRED EMBODIMENTS

Figure 1:
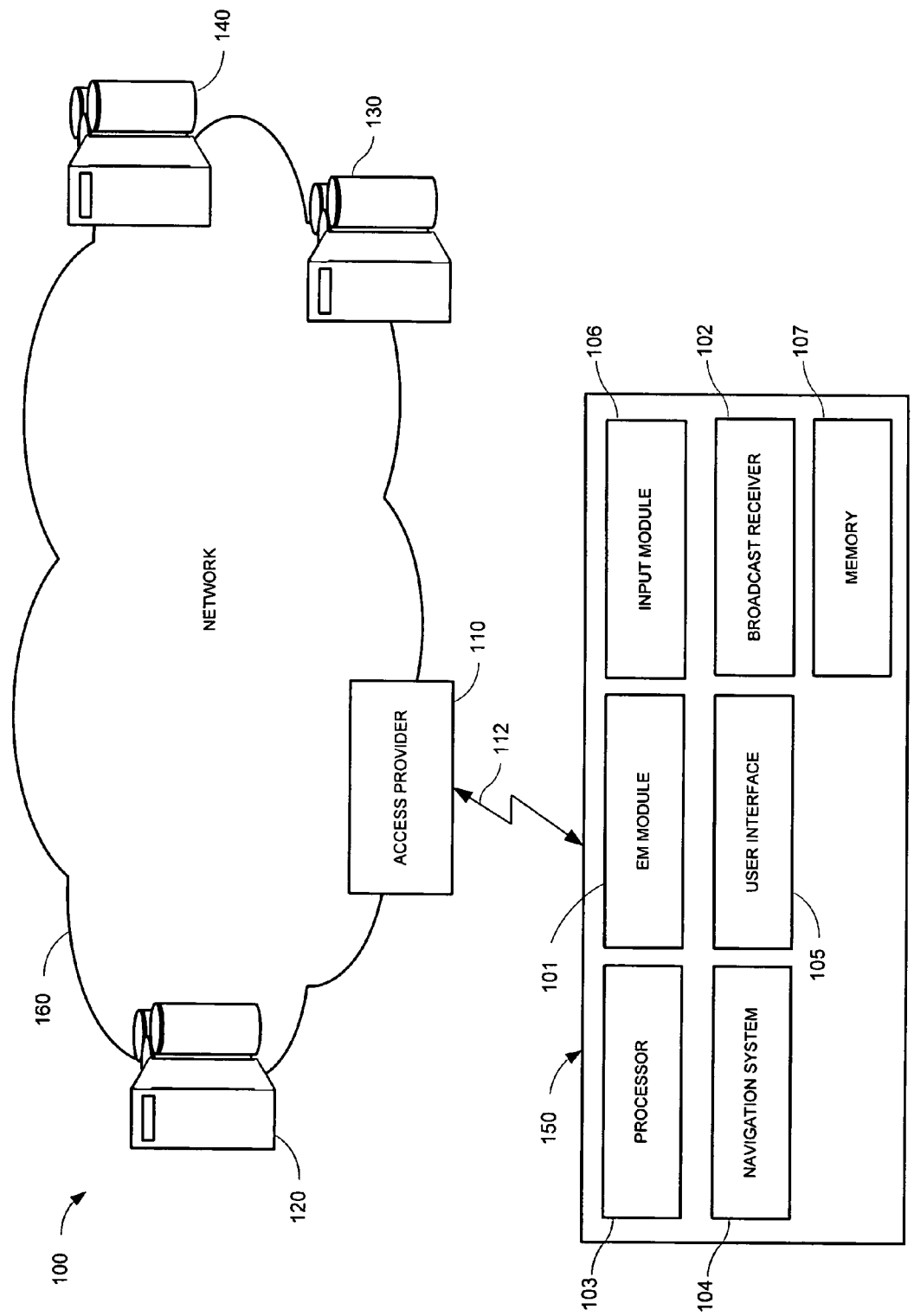
FIG. 1 is a diagram of a networked system for controlling access to a data service.

An example of a secure networked system 100 for controlling access to a data service (a "networked system") is shown in FIG. 1. The networked system is shown for explanatory purposes, and other networked system may be used. The networked system 100 may include, alone or in any combination: a server for controlling mobile access (a "mobile access control server") 120, one or more mobile devices 150, and systems (including devices and methods) for providing control of mobile access to a data service. The networked system 100 may also include a content server 130 through which one or more data services may be provided using data in encrypted form. A data service may include any type of service providing data in a wireless manner. For example, the data service may be a broadcast service, such as digital radio or video. Further, the networked system 100 may include a certificate authority ("CA") 140, which provides authentication by creating and issuing certificates. The networked system 100 may also include a network 160 that enables other components of the networked system to be in communication with each other.

In general, the mobile device 150, which may be portable or fixed within a mobile body, such as a vehicle (which may include automobiles, trucks and lorries, farming equipment, mining equipment, golf carts and mobile robots), may provide access to the data service. For example, the mobile device may include a browser application that provides such access. In addition, the mobile device may provide functions such as entertainment and information processing. The mobile device 150 may include an electromagnetic ("EM") module 101. The EM module 101 may be capable of receiving and transmitting data using electromagnetic signals according to various wireless standards, such as the universal mobile telecommunications system ("UMTS"), global system for mobile communication ("GSM"), Bluetooth, and wide local area networks ("W-LAN"). Hence, the EM module 101 may be used, for example, as a mobile telephone or as a device providing a wireless uplink (mobile device to an access network) and a wireless downlink (access network to mobile device) to access other networks via the access network of a radio access provider 110. Further, the mobile device 150 may include a broadcast receiver 102 that may be used to receive broadcasted electromagnetic signals, such as AM, FM or digital audio broadcasting ("DAB") signals, and/or digitally encoded data signals, such as radio data systems ("RDS") signals that may be sent along with other EM signals.

The mobile device 150 may further include a processor 103. The processor 103 may control the different components of the mobile device 150, manage and process information such as device-internal data or RDS information, process and respond to user input, and perform other functions. The processor 103 may be any type of device or devices used to process digital information. The mobile device 150 may also include a navigation system 104, or be in communication with an external navigation system. In either case, the processor 103 may be in communication and exchange data with the navigation system 104.

In order to interact with a user and to provide requested services and radio broadcast programs and information to a user, which may include the occupants of a vehicle, the mobile device 150 may include a user interface 105. The user interface 105 may be any type of visual, manual, audio, electronic or electromagnetic device capable of communicating information from a processor or memory to a user or other processor or memory. The user interface 105 may also communicate information with the processor or memory. The user interface 105 may include output devices. Examples of output devices include, but are not limited to, monitors, speakers, liquid crystal displays, networks, buses, and interfaces.

The mobile device 150 may enable user interaction with the networked system 100 by allowing a user to input data, such as, radio broadcast program selections, navigation destinations, and data for establishing phone calls and displaying traffic information. The mobile device 150 may include an input module 106, which may be any type of visual, manual, mechanical, audio, electronic, or electromagnetic device capable of communicating information from a person, or memory to a processor or memory. Examples of input devices include keyboards, microphones, voice recognition systems, trackballs, mice, networks, buses, and interfaces. Alternatively, the user interface 105 and input module 106 may be included in a single device such as a touch screen, computer, processor or memory.

Moreover, the mobile device 150 may also include a memory 107. The memory 107 may be any type of fixed or removable digital storage device and, may include a device for reading the digital storage device including, floppy disks and floppy drives, CD-ROM disks and drives, optical disks and drives, hard-drives, RAM, ROM and other such devices for storing digital information. The memory 107 may store user information, parameters as well as the programs and applications executed by the processor 103.

The mobile device 150 may access the network 160 through an access provider 110 that is in communication with the network 160. In some cases, the access provider may charge a time-based fee for access to the network. The mobile device 150 may be in communication with an access network of an access provider 110 over an EM link 112 using the EM module 101. The access provider 110 may be in communication with the network 160. Using the EM module 101, the mobile device 150 may establish a WAP connection to a WAP gateway of the radio access provider 110, to connect to the network 160, which may include the Internet, and to receive data services from a content server 130. Other connections may also be established, such as for storing digital information. The content server 130 may implement SSL to securely communicate with the other communication endpoint. Hence, when establishing a connection between mobile device 150 and a content server 130, HTTPS may be used to secure this communication. The certificates necessary for SSL may be either provided by the content server 130 or by a certificate authority 140 with which the content server 130 may be in communication via the network 160.

The mobile access control server 120, CA 140, and content server 130 may include a server that includes one or more memories and processors for providing and communicating digital information. The network 160 may include any wired or wireless (for example, the Internet) system that allows the communication of digital information via electromagnetic signals among digital devices and/or systems.

The mobile access control server 120 may control the access by the mobile device 100 to particular data services by providing or not providing a certificate to the mobile device 150. Contrary to the common SSL procedure, the mobile access control server 120 may prohibit the mobile device 150 from downloading certificates directly from the content server 130 or the certificate authority 140. Instead, the mobile access control server 120 may allow the mobile device 150 to receive the certificate or certificates only from the mobile access control server 120 via the network 160.

In use, the mobile device 150 may make a request to the mobile access control server 120 for access to the data service (an "access request"). This request may indicate the particular data service to which access is requested, and/or an identifier of the mobile device 150 making the request. Upon receiving the access request, the mobile access control server 120 may determine whether the mobile device 150 is allowed to access the requested data service. The mobile access control server 120 may make this determination based on the identifier supplied by the mobile device 150 in an access request.

If the access control server 120 determines that the mobile device 150 is not allowed to access the data service, the mobile access control server 120 may initiate a subscription process that enables the mobile device 150 to subscribe to the requested data service.

In contrast, if the mobile access control server 120 determines that the mobile device 150 is allowed to access the requested data service, the mobile access control server 120 may provide information relating to the content server providing the requested data service (the "access information") to the mobile device 150. The access information may include a certificate, such as an X.509 certificate. Alternately, or in addition, the access information may include a session key that enables the mobile device to decrypt the encrypted data service. Before providing the access information to the mobile device 150, the mobile access control server 120 may determine whether the access information is stored within the mobile access control server 120. If the access information is not stored within the mobile access control server 120, the mobile access control server may request the access information from the content server 130 or a certificate authority 140. The mobile access control server 120 may then receive the access information. In addition, the mobile access control server 120 may store the access information. Having the mobile access control server 120 obtain and store the access information may provide a faster response to subsequent access requests, and may significantly reduce the signaling between the mobile device 150 and the mobile access control server 120 for subsequent access requests. This may be relevant when the mobile device 150 is in communication with the mobile access control server 120 over an EM link having scarce resources.

The mobile access control server 120 may then communicate the access information to the mobile device 150 via the network 160 and perhaps through an access provider 110. Alternately, the mobile access control server 120 may provide a message to the mobile device 150 indicating a location within the mobile access control server 120 from which the access information may be obtained by the mobile device 150. In particular, the message mentioned above may be a systems management server ("SMS") or multimedia message service ("MMS") message, which may indicate a location within the mobile access control server 120 in the form of a uniform resource locator ("URL"). Upon receiving such a message, the mobile device 150 may request the access information in the location indicated in the message. In turn, the mobile access control server 120 may communicate the access information to the mobile device 150, which may store the access information for current and/or later use.

If the mobile device 150 makes the access request through an access provider 110 that charges a time-based fee for access to the network 160, in order to save resources and reduce costs, the mobile device may terminate the EM link 112 to the access provider 110 after making the access request. Further, so that the mobile device 150 may obtain the access information from the mobile access control server 120, the mobile device 150 may include a timer (not shown) that is started during or after the mobile device 150 makes the access request. When the timer expires, the mobile device 150 may reestablish communication with the access provider 110 to request and receive the access information from the mobile access control server 120. Hence, the timer may be used to trigger establishment or reestablishment of EM link 112 between the mobile device 150 and the access provider 110. After the access information is received, the mobile device may terminate the EM link 112.

The mobile device 150 may use the access information to establish an encrypted connection (or a "session," for example when made within HTTPS) to the content server 130 or to decrypt encrypted data communicated with the data service via the content server 130. In some cases, the mobile device 150 may only use secure communication when accessing a data service (such as a data service that provides data delivery according to the SSL de facto standard or HTTPS protocol), if the mobile device 150 has the access information needed to establish a session or connection for communicating encrypted data. Further, when trying to receive an encoded data service, such as an audio or video broadcast service, from a content server 130, the mobile device 150 may only be capable of receiving and decoding the data that is provided with the correct session key. Hence, the access to data services may be controlled by a mobile access control server 120 by only providing the mobile device 150 with the necessary access information for successfully receiving the requested data service, if the mobile device 150 is granted access to the service by the mobile access control server 120. This access control mechanism is also independent from the point of access of the mobile device to the network.

Prior to making an access request to the mobile access control server 120, the mobile device 150 may determine whether the access information is stored in the mobile device 150, itself. If the access information is stored in the mobile device 150, for example as the result of a previous access request, the mobile device 150 may establish an encrypted connection to the content server 130 or decrypt encrypted data provided by the data service via the content server 130 using the stored access information. Because the mobile device 150 determines whether the mobile device 150 itself stores the access information, the mobile device 150 only may only need to make an access request once for a given data service. Taking an HTTPS session as an example, as long as the access information, such as a certificate, received from the mobile access control server 120 is valid for establishing session with the desired content server, no extra signaling between the mobile access control server 120 and the mobile device 150 may be needed. However, in some cases, the access information may be valid only for a given amount of time (the "validity period"). Therefore, the mobile access control server 120 may still control access to the data services because the mobile device 150 may need to submit an access request to the mobile access control server 120 to have access to the data service after the validity period ends.

Figure 2:
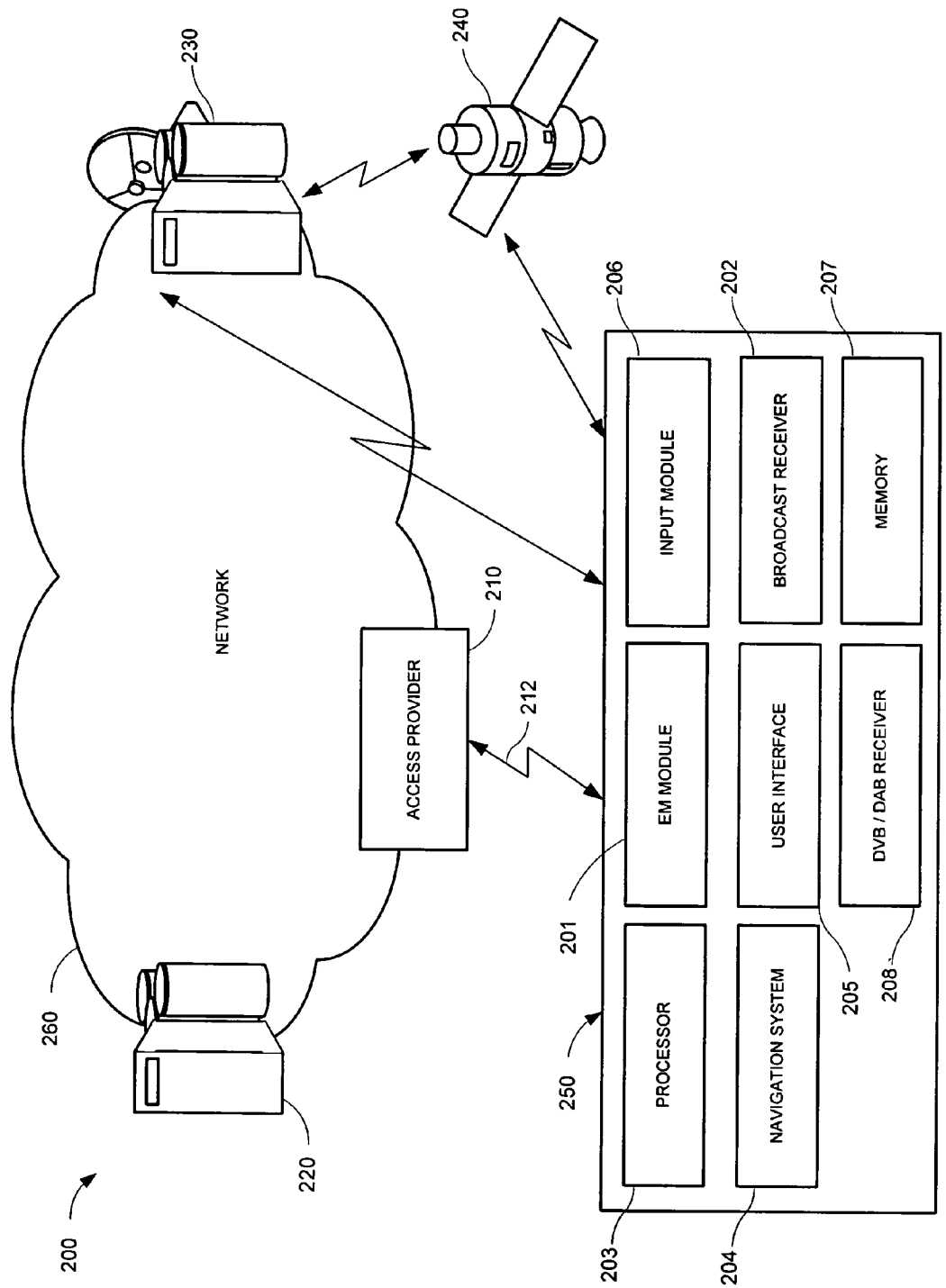
FIG. 2 is a diagram of another networked system for controlling access to a data service.

Another networked system is shown in FIG. 2. The networked system 200 of FIG. 2 may include alone or in any combination: a mobile access control server 220, one or more mobile devices 250, systems (which may include methods and/or devices) for providing control of mobile access to a data service. Further, the networked system 200 may include a certificate authority 240, which provides authentication by creating and issuing certificates. The networked system 200 may also include a content server that may include a digital video broadcast/digital audio broadcast ("DVB/DAB") provider 230. The networked system 200 may also include a network 260 that enables the other components of the networked system to be in communication with each other. The descriptions of the components of the networked system 100 discussed in relation to FIG. 1, may apply to the corresponding components in the networked system 200 shown in FIG. 2.

The mobile device 250 may include, alone or in any combination: a processor 203, navigation system 204, user interface 205, input module 206, broadcast receiver 202, and memory 207. In addition, the mobile device 250 may include a receiver for receiving data, including digital video and/or digital audio broadcasts. For example, as shown in FIG. 2, the receiver may include a DVB/DAB receiver 208. Although the description that follows is made in terms of a DVB receiver, the mobile device 250 may include any type of receiver for receiving digital video and/or digital audio broadcasts. DVB is merely one example of an international digital broadcast standard for television, audio and data. DVB may include broadcast via satellite 202 ("DVB-S"), cable ("DVB-C"), terrestrial systems ("DVB-T"), or via DVB-H, for small mobile systems. In addition DVB/DAB data (programs) may be provided via IP networks.

DVB may provide digital video, audio and data streams. According to the different DVB standards, one or more streams may be provided by a DVB provider 230. When broadcasting via DVB-S, DVB-C or DVB-T and antennas, there may be several broadcast channels available. In other words, multiple streams may be provided on different carrier frequencies. Each stream may be identified by an identification that may be referred to as a "stream_ID."

Each stream may carry a plurality of different broadcast programs. A DVB transport stream ("TS") uses variable length frames (each a "program elementary stream" or "PES"). Each PES may include a header (a "PES header") and a payload section. The payload section may include data, and the PES header may identify the program to which the data that follows the PES header belongs, and the length of the data. Hence, the DVB stream may carry multiple multiplexed broadcast programs.

In addition, to the payload data carrying streams, one or more "control streams" or "control channels" may be broadcasted. A control stream may identify the different programs multiplexed in each DVB TS. The control channels may include a program association table ("PAT"), program map table ("PMT"), conditional access table ("CAT"), and network information table ("NIT").

The PAT may indicate the location of the corresponding PMT. The PAT may also provide the location of the NIT. The PMT may identify and indicate the locations of the streams that make up each service (video, audio or data), and the type of the encryption used on the data. The CAT provides information on the CA systems used in the multiplex. This information is private, depends on the CA system, and may include the location of the EMM stream, when applicable. The NIT may provide information about the physical network. A comparable implementation of frame structures, streams and lookup tables may be used for DAB.

The DAB and DVB streams may also be protected from unauthorized access by scrambling. An example of a CA system implemented with a scrambling method is described in ETR 289 (Digital Video Broadcasting ("DVB"); Support for use of scrambling and Conditional Access ("CA") within digital broadcasting systems). The scrambling method may operate on the payload of a TS packet when TS-level scrambling is used. A structuring of program elementary stream ("PES") packets may be used to implement PES-level scrambling with the same scrambling algorithm.

According to the PES level scrambling method, the PES packet header may not be scrambled and TS packets containing parts of a scrambled PES packet may not contain an adaptation field (with the exception of the TS packet containing the end of the PES packet). The header of a scrambled PES packet may not span multiple TS packets. The TS packet carrying the start of a scrambled PES packet may be filled by the PES header and the first part of the PES packet payload.

The first part of the PES packet payload may be scrambled in the same manner as a TS packet with a similar sized payload. The remaining part of the PES packet payload may be split in super-blocks of 184 bytes. The super-blocks may be scrambled as a TS packet payload of 184 bytes. The end of the PES packet payload may be aligned with the end of the TS packet by inserting an adaptation field (an "AF") of suitable size. If the length of the PES packet is not a multiple of 184 bytes, the last part of the PES packet payload (from 1 to 183 bytes) may be scrambled in the same manner as a TS packet with a similar sized payload.

The PES level scrambling method may put some constraints on the multiplexing process to make the de-scrambling process easier. This may create some bit-rate overhead if AFs are needed in TS packets carrying scrambled PES packets. When this is the case, a TS packet containing only an AF may be inserted.

For applications that scramble MPEG-2 sections, a problem may arise because the MPEG-2 specified syntax does not include any scrambling control bits. Therefore, the scrambling of sections may be at the TS level and may be signaled by the scrambling control field bits. Clear and scrambled sections may not be combined in a single TS packet. The MPEG-2 defined padding mechanism may be used to create TS packets with only clear or only scrambled sections. The end of a TS packet carrying a Section may be filled with bytes having a value of 0xFF, in order to separate clear and scrambled sections into different TS packets.

The algorithm described above is designed to minimize the amount of memory in the de-scrambler circuit at the expense of the complexity in the scrambler. The exact amount of memory and the de-scrambling delay depend on actual implementations.

To secure the broadcast of DVB/DAB programs, the payload data may be encrypted by a symmetrical session key, which may be distributed to subscribers of the respective DVB program. Therefore, by controlling the distribution of a valid session key, the access to a DVB/DAB programs may be controlled. The mobile access control server 220 may distribute the session key for a DVB channel to the mobile device 250 upon receiving an access request from the mobile device 250 and determining whether the mobile device 250 is allowed to receive the requested channel (data service). The session key may be valid for a certain time period only, such that also timely limited subscriptions may be possible. Information about the validity period of a session key may be also communicated from the mobile access control server 220 to the mobile device 250 along with the session key.

Figure 3:
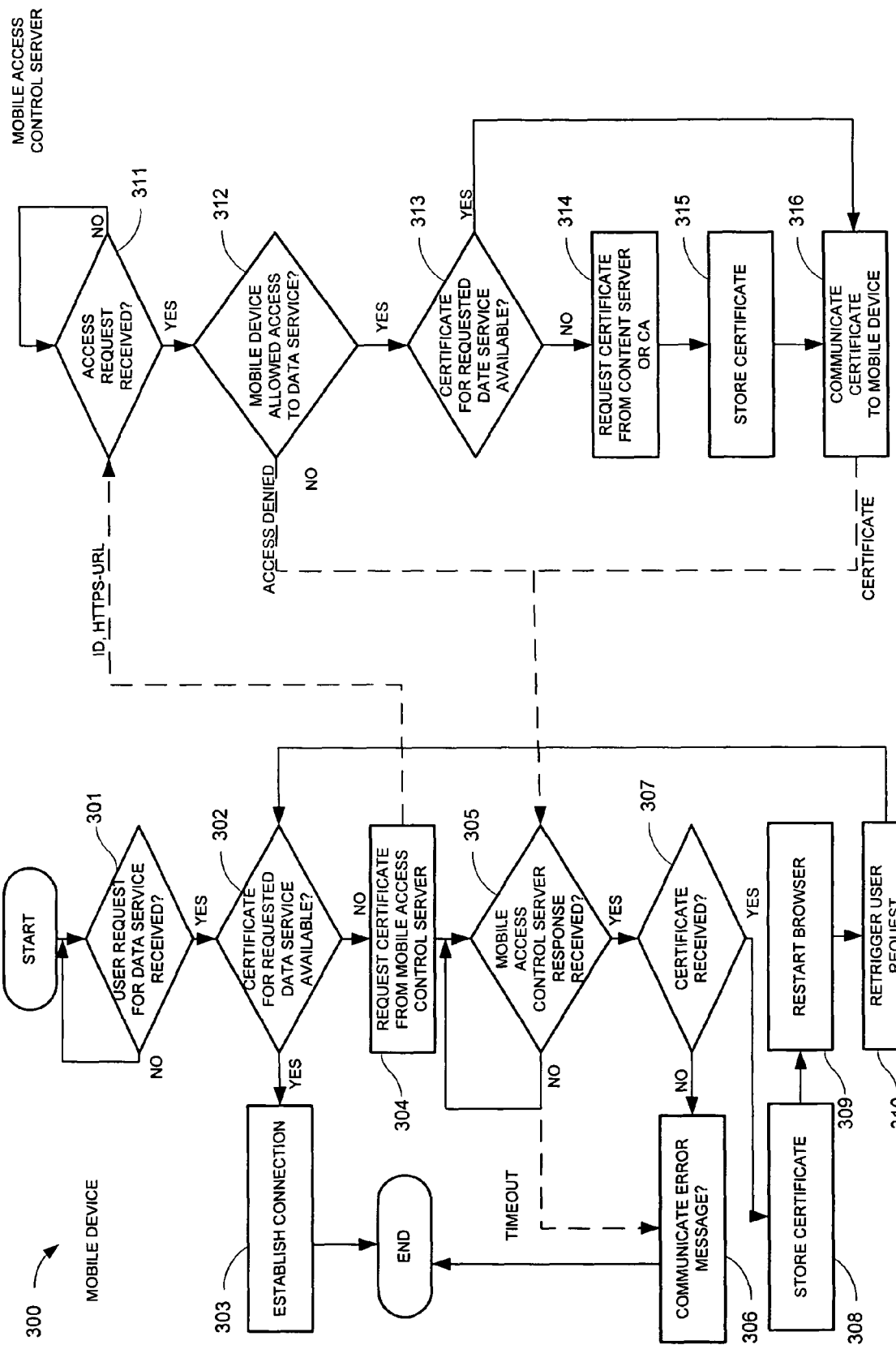
FIG. 3 is a flow chart of a method for controlling mobile access to a data source.

A method for controlling mobile access to a data service is shown in FIG. 3. Other methods may be used, such as the method described in connection with FIG. 4. The method 300 shown in FIG. 3 may be implemented with a mobile device and a mobile access control server, such as those shown in FIG. 1 (reference numbers 150 and 120, respectively) and FIG. 2 (reference numbers 250 and 220, respectively). Therefore, the method 300 may be implemented to allow secured data delivery from a data server through network. For example, in addition to HTTPS based service delivery, DVB channels may be delivered via the Internet and an access network to the mobile device.

The mobile device may determine whether it has received a request for a data service from the user 301. Alternately, the request may come from other external sources or from the mobile device itself, and generally identifies the requested data service. The request may include the URL of a data service that is located on an HTTPS.

When the mobile device determines that it has received a request, the mobile device may determine whether the one or more certificates required to access the requested data service is available from the mobile device itself 302. This may involve determining whether the mobile device or any other device or system with which the mobile device is in communication is storing the required certificate(s). For example, the mobile device may have stored the required certificate(s) in its memory. If the mobile device determines that the required certificate is available from the mobile device itself, determining whether the required certificate is available from the mobile device 302 may also include the mobile device determining whether the certificate is still valid or whether the certificate has expired. If the required certificate is available from the mobile device, this may be due to a previous access request made by the mobile device to the requested data service.

If the required certificate is available from the mobile device itself, the mobile device may establish a connection with the content server on which the requested data service is stored 303. For example, the mobile device may establish an SSL connection to the selected HTTPS content server 303 according to the SSL protocol.

In contrast, if the required certificate is not available from the mobile device, the mobile device may send an access request for the required certificate to an access control server, content server, or CA. However, in some cases the mobile device may be not allowed to obtain the missing certificate directly from either the content server, or the CA. The access request may identify the required certificate, requested data service, or the content server on which the requested data service resides. For example, the access may include the HTTPS-URL of the content server on which the desired data service resides. Further, the access request may include an identifier ID which uniquely identifies the mobile device. This information may be used by the mobile access control server to determine whether the requesting mobile device is allowed to receive the requested data service offered from the content server corresponding to the HTTPS-URL indicated in the access request. In addition, this information may also be used to send a requested certificate(s) and/or an error message back to the mobile device. The identification may be, for example a unique identification identifying the mobile device, user, or a vehicle or in which the mobile device may be used.

After sending the access request to the mobile access control server, the mobile device may await a response from the mobile access control server 305. The mobile device may wait indefinitely or until a predetermined amount of time has expired for a response from mobile access control server. If the mobile device waits indefinitely, it will wait until a response from the mobile control access device is received. If, however, the mobile device waits for only a fixed amount of time, when the mobile device determines that the fixed time period has expired (timedout), the mobile device may communicate an error message to the user. The mobile device may communicate an error message with an output module. For example, the error message may inform the user that the mobile access control server did not respond to the access request, or denied access to the desired data service.

In contrast, when the mobile device receives a response to the access request, the mobile device may determine whether the response from the mobile access control server includes the required certificate(s) 307. If the response from the mobile access control server does not include the required certificate(s), the mobile device may communicate an appropriate error message to the user 306. If, however, the response from the mobile access control server does include the required certificate(s), the mobile device may store the required certificate(s) 308.

If the mobile device includes a browser for providing the requested service to the user, the mobile device may restart the browser 309 before proceeding, because some browsers require that all certificates be available before the start of the browser. Restarting the browser 309 is optional and may be executed if required by the application used to provide the requested data service to the user.

The mobile device may retrigger the user request for the data service 310. The data service may be requested again and the process repeats. The mobile device determines again whether all certificate(s) for setting up the SSL connections are available 302. However, the required certificate(s) may be available to the mobile device, and a connection may be established, such as an SSL connection, with the content server 303 on which the requested data service is stored.

With respect to the mobile access control server, the mobile access control server waits for an access request from a mobile device 311. When the mobile access control server receives an access request from a mobile device, the mobile access control server may determine whether the mobile device making the access request requesting is allowed to access the requested data service 312. The mobile access control server may make this determination by identifying the mobile device and the requested service by the identifications included in the access request. The mobile access control server may then determine whether an access profile corresponding to the mobile device grants access to the requested data service.

If the access control server determines that the mobile device is not allowed to access the requested data service 312, the mobile access control server may send a reply to the mobile device, which may include an error message indicating that access was denied. Alternatively, the mobile access control server may initiate a registration or subscription procedure with the mobile device, allowing the user to subscribe for the requested data service (not shown).

If, however, the mobile access control server determines that the mobile device does have permission to access the requested data service 312, the mobile access control server may determine whether the required certificate(s) are available from the mobile access control server itself 313. In other words, the mobile access control server may determine whether it already stored the required certificate(s). If the mobile access control server determines that the required certificate(s) are available locally, the mobile access control server may communicate the certificate(s) to the requesting mobile device 316. If, however, the mobile access control server determines that the certificate(s) are not available locally, the mobile access control server may request the certificate(s) from the content server storing the requested data service, or a certificate authority 314. Upon receiving the certificate(s), the mobile access control server may store the certificate(s) 315 and may forward them to the mobile device 316. This procedure allows the mobile access control server to control the mobile device's access to data services by controlling the distribution of the certificates required to access the data services.

Alternately, under certain circumstances, the mobile access control server may only communicate to the mobile device whether the mobile device has permission to access the requested data service and not the required certificate. For example, the mobile device may have available to it a required and unexpired certificate, but the user of the mobile device has unsubscribed from or let the subscription lapse for the corresponding data service. In this case, when the mobile device makes an access request for the data service for which the subscription has lapsed or expired, the mobile device may only request from the mobile access control server information regarding whether the user or mobile device is still allowed to use the requested data service. In response, the mobile access control server may communicate this information without communicating the required certificate.

Figure 4:
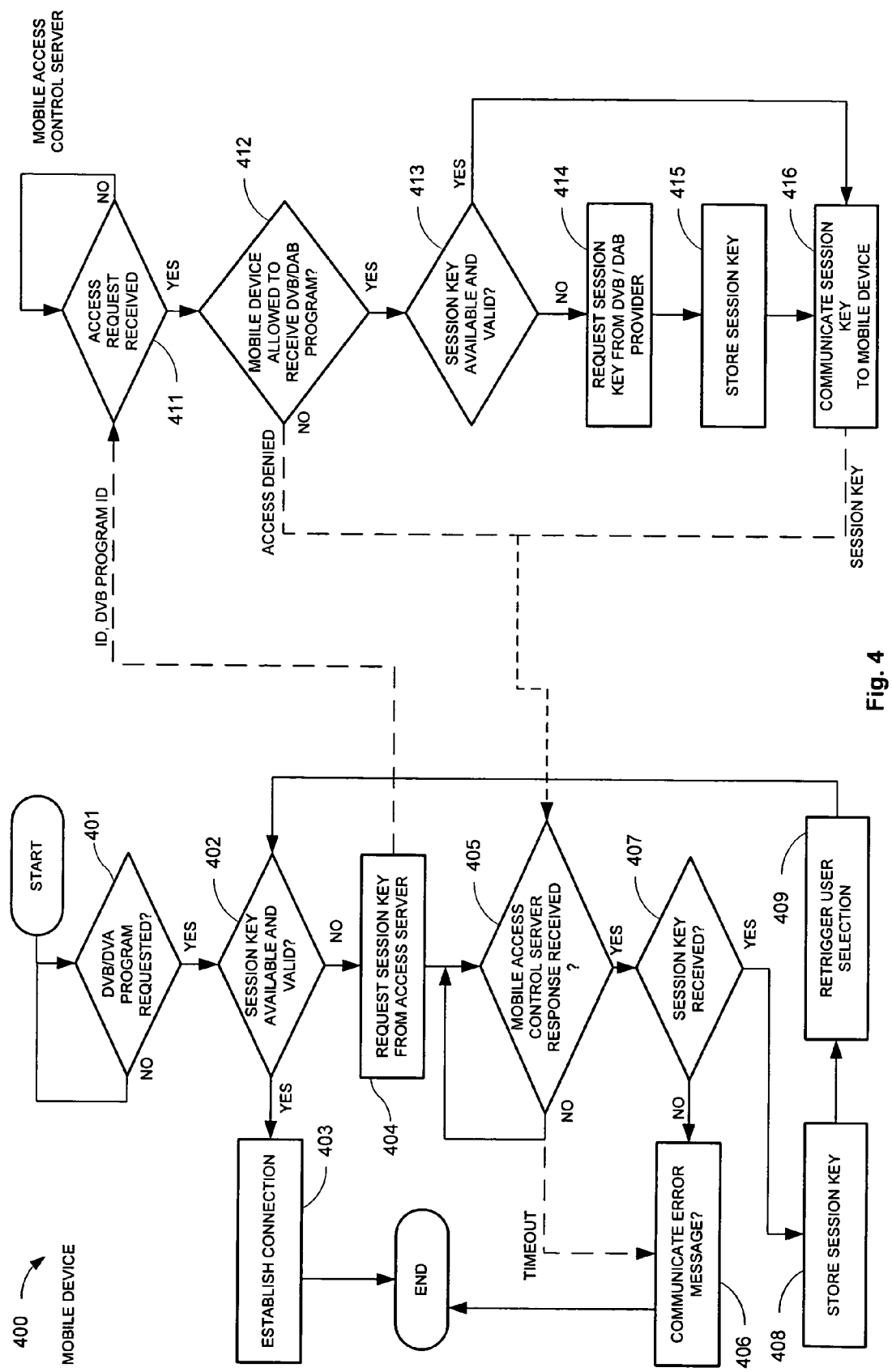
FIG. 4 is a flow chart of another method for controlling mobile access a data source.

Another method for controlling mobile access to a data service is shown in FIG. 4. This method 400, may be implemented by a mobile device and a mobile access control server, such as those shown in FIG. 2 (reference numbers 250 and 220, respectively), when the mobile device makes an access request for an encrypted DVB channel (or data service).

The mobile device may determine whether it has received a request for a data service from the user 401. Alternately, the request may come from other external sources or from the mobile device itself, and generally identifies the requested data service. For example, in this example, the mobile device determines whether it has received a request for a DVB/DAB program 401. If the mobile device determines that a request for a DVB/DAB program has been received, the mobile device may determine whether the session key required to decrypt the requested DVB/DAB program is available from the mobile device, and whether the session key has expired (whether the session key is still valid). For example, the required session key may be stored in the memory of the mobile device itself.

If the required session key is available from the mobile device (locally available), the mobile device may receive and decrypt the DVB/DAB program 403. For example, if the program is a DVB-S program, the broadcast receiver (see FIG. 2, reference number 202) of the mobile device may be tuned to the requested channel and may start receiving the data from a satellite. If the session key is already locally available from the mobile device, the mobile device may have previously communicated an access request for the requested data service or DVB/DAB program and obtained the required session key from the mobile access control server.

If, however, the mobile device determines that the required session key is not available from the mobile device, the mobile device may submit an access request for the required session key from the mobile access control server 404. In some cases, the mobile device may be not allowed to obtain the required session key directly from the content provider (in this case a DVB/DAB provider) that supplies the requested data service (in this case, the DVB/DAB program). The access request may identify the requested data service or DVB/DAB program. For example, the access request may include the channel code for the requested DVB/DAB. Further, the access request may include an identifier that allows the mobile access control server to uniquely identify the mobile device. The mobile access control device may use the identifier to determine whether the requesting mobile device is allowed to receive the requested DVB/DAB program from the DVB/DAB provider. The mobile access control server may also use the identifier to send the requested session key and/or an error message back to the mobile device.

The mobile device may await a response from the mobile access control server 405 for a predetermined or indefinite time interval. Upon expiry of a predetermined time interval (in other words, the request times out), the mobile device may interrupt the access request output an appropriate error message 406 using the user interface of the mobile device, for example, a display, speakers or both. The error message may communicate to the user that the mobile access control server did not respond or that the mobile access control server denied access to the DVB/DAB program.

Upon receiving a response from the mobile access control server, the mobile device determines whether the response from the mobile access control server includes the required session key 407. If the response from the mobile access control server does not include the required session key, and receives, for example, an access denied message, an appropriate error message may be communicated to the user 406. If, however, the mobile device determines that the response from the mobile access control server includes the required session key, the mobile device may store the session key within the mobile device itself 408.

The mobile device may then retrigger the request for the DVB/DAB program 409. The method 400 may repeat from step from step 402, during which the mobile device again determines whether the required session key is available from the mobile device. In this instance, the required session key may be stored at the mobile device, having been stored during the previous iteration of the method 400, and the requested DVB/DAB program can may be received, successfully decrypted and communicated to the user 403.

In this method 400, the mobile access control server determines whether it has received an access request from the mobile device 411. When the mobile access control server determines that it has received an access request from the mobile device, the mobile access control server may determine whether the mobile device making the access request is allowed to receive or use the requested DVB/DAB program or data service 412. For example, the mobile access control server may examine an access profile that corresponds with the mobile device identified in the access request and determine whether the access profile grants access to the requested data service.

If the mobile access control server determines that the requesting mobile device is not allowed to access the requested data service, the mobile access control server may communicate an access denied message to the mobile device 412. Alternatively, the mobile access control server may initiate a registration or subscription procedure with the mobile device that allows the user to subscribe to the requested DVB/DAB program or data service.

If the mobile access control server determines that the requesting mobile device is allowed to access requested data service, and perhaps that the session key is valid, the mobile access control server may determine whether the required session key is available locally and if the required session key is valid 413. In other words, the mobile access control server may determine whether the session key is already stored in the mobile access control server itself. If the mobile access control device determines that the session key is already stored in the mobile access control server, and perhaps is valid, the mobile access control server may communicate the session key to the requesting mobile device 416. If the required session key is not available locally, the mobile access control server may request the required session key from the DVB/DAB provider 414. Upon receiving the required session key, the mobile access control server may store the required session key 415 and may forward the required session key to the mobile device 416. This method 400 allows the mobile access control server to control the access of the mobile devices to DVB/DAB programs by controlling the distribution of the required session keys.

Alternately, under certain circumstances, the mobile access control server may only communicate to the mobile device whether the mobile device has permission to access the requested data service and not the session key required to do so. For example, the mobile device may have available to it a required and unexpired session key, but the user of the mobile device has unsubscribed from or let the subscription lapse for the corresponding data service, such as a DVB/DVA program. In this case, when the mobile device makes an access request for the data service for which the subscription has lapsed or expired, the mobile device may only request from the mobile access control server information regarding whether the user or mobile device is still allowed to use the requested data service. In response, the mobile access control server may communicate this information without communicating the required session key. In another example, the mobile access control server may track the valid session keys provided to a mobile device. Upon lapse of or unsubscription from a data service, the mobile access control server may cause the mobile device to delete the session key for the lapsed or unsubscribed data service.

Figure 5:
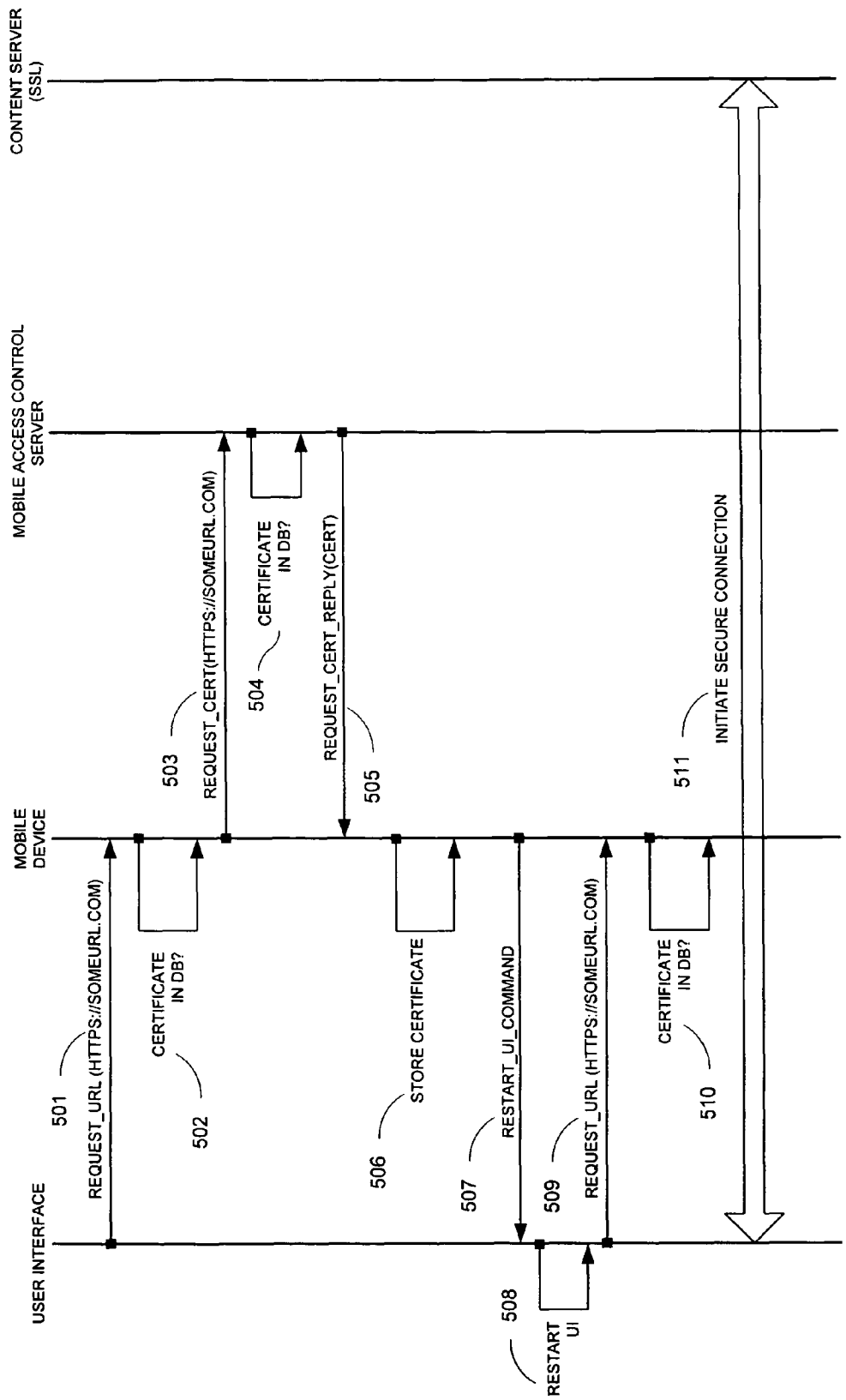
FIG. 5 is a diagram of message flows among the components of the networked system shown in FIG. 1 during a situation in which the mobile device has stored a requested certificate locally.

FIGS. 5 through 8 illustrate exemplary message flow diagrams illustrating the message flow between the different components of the networked system 100 shown in FIG. 1. An example of a message flow that may result when a mobile device makes an access request for a data service from the mobile access control server is shown in FIG. 5. In this example the mobile access control module has stored the requested certificate locally. Initially, the user, through a user interface of the mobile device (see FIG. 1, reference number 105) may communicate a request for an HTTPS-URL to the mobile device 501. When the mobile device receives this request, the mobile device may determine whether the certificate required for the requested data service are locally available 502. In the example illustrated, the certificate is not available, and therefore the mobile device may send an access request for the certificate to the mobile access control server 503.

Upon receiving the access request from the mobile device, the mobile access control server may determine whether the requesting mobile device is allowed to access the requested data service, and if the requesting mobile device is allowed to access the requested data service, whether the required certificate is locally stored 504. In this example, the certificate is stored in the mobile access control server, and therefore, may be communicated by the mobile access control server to the mobile device in a reply message 505.

The mobile device may then store the required certificate 506, and may optionally initiate a restart of the browser application used for providing the data service to the user 507. For example, the mobile device may communicate a command to the user interface of the mobile device to restart the browser application. The user interface may then restart the browser 508, and may retrigger the request for the data service 509. The mobile device may again determine whether the required certificate available locally 510. In this instance, the certificate is available for the mobile device locally because the mobile device received and stored the certificate in the prior iteration. The mobile device may then initiate the setup of a secure SSL connection to the content provider of the data service 511.

In a variation of the message flow shown in FIG. 5, the mobile device may communicate messages to the user interface, which are communicated to the user to inform the user about the status of the user's request. For example, when the mobile device makes an access request for a certificate to access a data service 503, a corresponding message may be output to the user. In another example, when the mobile device receives the required certificate from the mobile access control server, the user interface may communicate this event to the user. In addition, error messages may be communicated as described in connection with FIG. 2 and FIG. 3.

In another example, if the user requests a DVB/DAB program, the message flow may be similar to that shown in FIG. 5. The user may communicate the requested DVB/DAB program to the mobile device by tuning the mobile device to the requested encrypted DVB channel. The mobile device may then perform the actions as described in connection with FIG. 3. Because a link between an access network of an access provider and the mobile device may not be required for the mobile device to receive the DVB/DAB program, the mobile device, using its EM module (see reference number 201 in FIG. 2), may not have established an EM link with the network (see reference number 260 in FIG. 2). Therefore, mobile device may request permission from the user before establishing a link to the mobile access control server to download a required session key if the required session key is not stored locally. Upon establishing a link with the mobile access control server, the mobile device may request a session key for the DVB/DAB program. The mobile device may store the session key upon reception of the session key from the mobile access control server.

Figure 6:
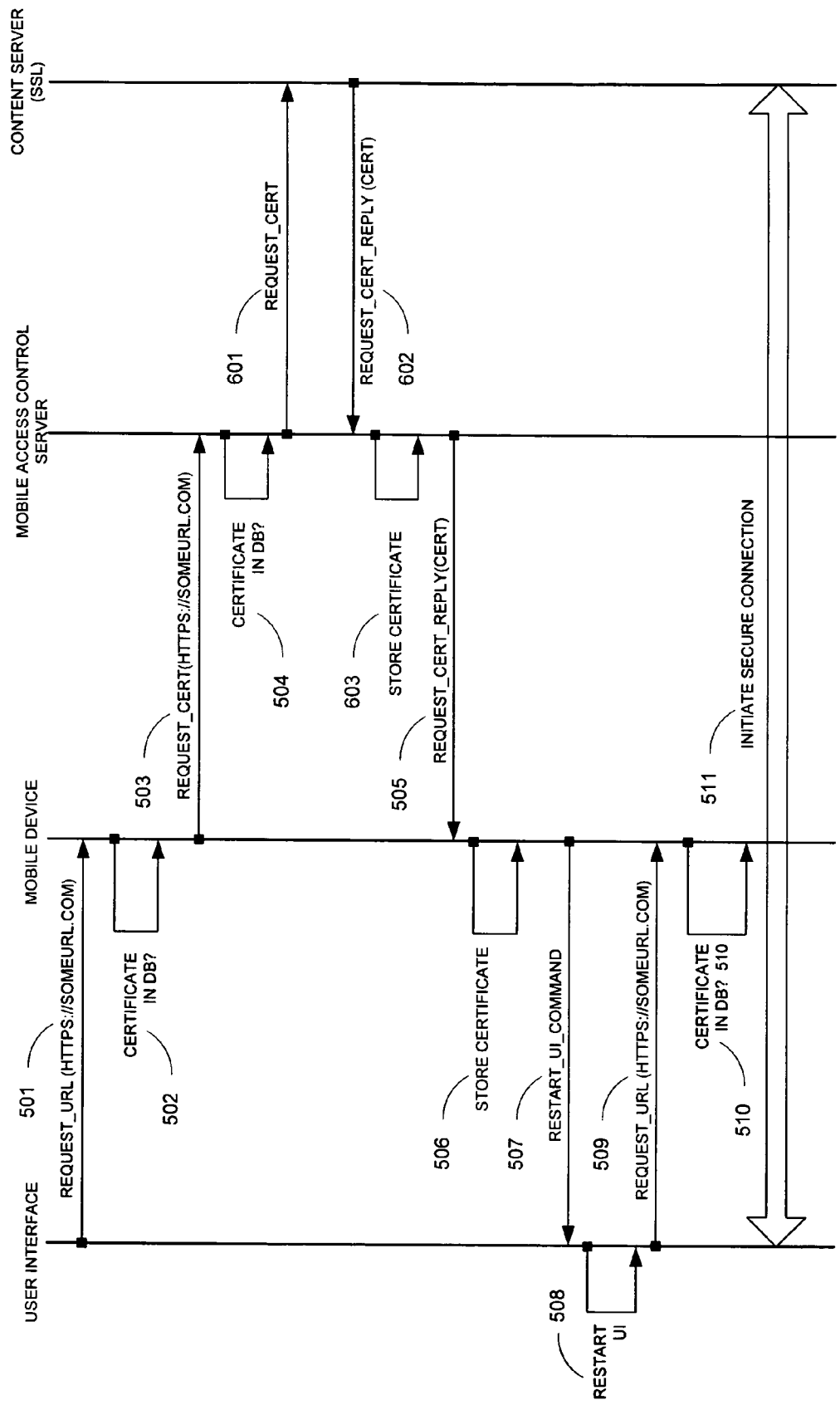
FIG. 6 is a diagram of message flows among the components of the networked system shown in FIG. 1 during a situation in which a mobile access control server requests a certificate from a content server.

Another example of a message flow that may result when a mobile device makes an access request for a data service from the mobile access control server is shown in FIG. 6. In this example, the requested certificate is not available at the mobile access control server, which then requests the certificate from the content server providing the requested data service. As discussed in connection with FIG. 5, upon receiving a request for a data service from the user via the user interface 501, the mobile device determines whether the certificate required to access the requested data service is available from the mobile device 502. The mobile device may determine that the required certificate is not available from the mobile device, and therefore makes an access request for the required certificate to the mobile access control server 503. Upon determining that the requested certificate is not locally available 504, the mobile access control server may send a certificate request message to the content server providing the requested service 601. The mobile access control server may, for example, send a message according to the SSL protocol. In response, the content server may send the required certificate to the mobile access control server 602. Upon receiving the certificate from the content server, the mobile access control server may store the certificate 505. The remaining messages 505, 506, 507, 508, 509, 510, and 511, correspond to the messages in FIG. 5 with the same respective reference numbers.

Figure 7:
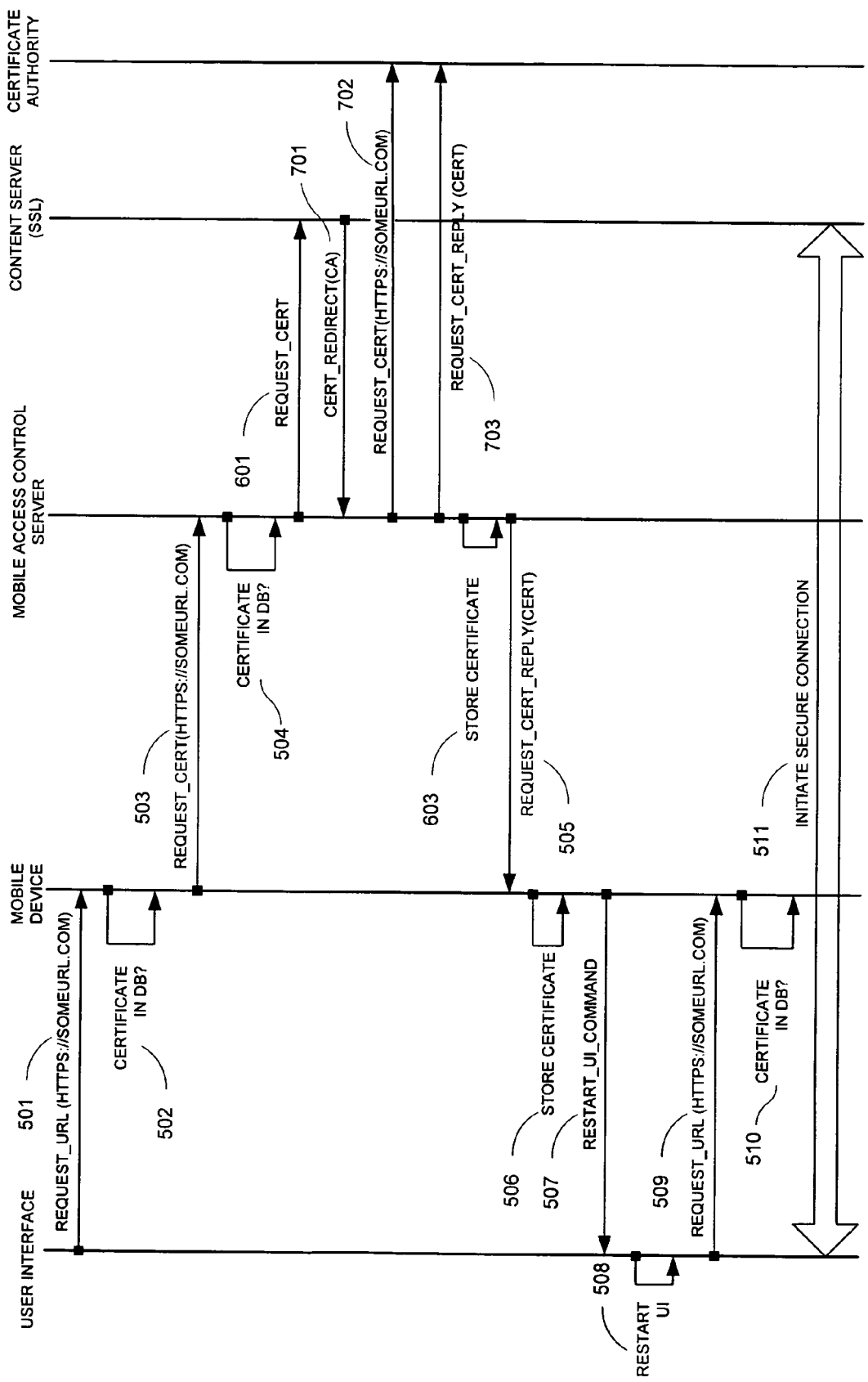
FIG. 7 is a diagram of message flows among the components of the networked system shown in FIG. 1 during a situation in which a content server redirects a mobile access control server to a certificate authority to requests a certificate.

Another message flow that may result when a mobile device makes an access request for a data service from the mobile access control server is shown in FIG. 7. Messages 501, 502, 503, 504, 505, 506, 507, 508, 509, 510 and 511 correspond to the respective identical messages in FIG. 5. Further, messages 601 and 603 correspond to the respective identical messages in FIG. 6. Some of the message flow shown in FIG. 7 corresponds to the message flow shown in FIG. 6, except as set forth in the following description. In this example, the content server may redirect the mobile access control server to a certificate authority to obtain the required certificate from 701. Therefore, upon receiving a request for the content server's certificate from the mobile access control server, the content server may reply with a message indicating the certificate authority from which the mobile access control server may obtain the required certificate 701.

Upon receiving this redirect message from the content server, the mobile access control server may send a certificate request message to the certificate authority indicated by the content server 702. The request message indicates the data service or content server for which the certificate is requested. In response to the request, the certificate authority may communicate a reply message that includes requested certificate 703. Upon receiving the certificate, the mobile access control server may store the certificate 603 and forward the certificate to the mobile device 505. The remaining messages correspond to those shown in FIG. 6.

Figure 8:
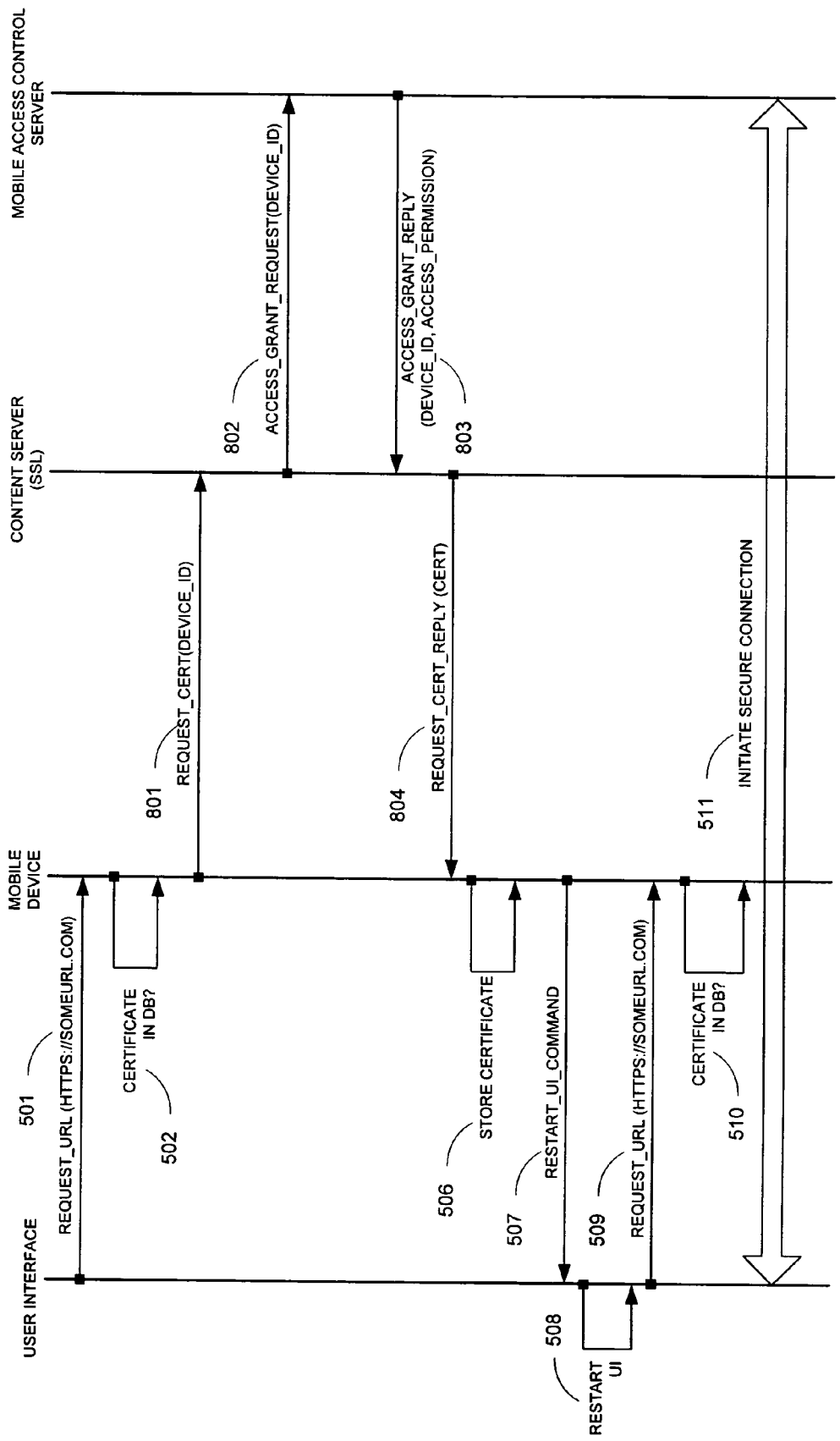
FIG. 8 is a diagram of message flows among the components of the networked system shown in FIG. 1 during a situation in which a mobile device may contact a content server directly.

Another message flow that may result when a mobile device makes an access request for a data service from the mobile access control server is shown in FIG. 8. In this example, access to data services and DVB/DAB programs is controlled by the mobile access control server, which controls the provision of certificates or session keys to the mobile device. However, this message flow differs from those previously discussed in that the mobile device is permitted to contact the content server or the DVB/DAB provider directly. Messages 501, 502, 506, 507, 508, 509, 510, and 511, respectively correspond to those of FIG. 5. When the user interface requests a data service 501, and the mobile device has determined that the certificate required to access the requested data service is not locally available 502, the mobile device may request the certificate directly from the content server that provides the requested data service 801. The request communicated by the mobile device may include an identification uniquely identifying the requesting mobile device.

The content server may then communicate to the mobile access control server a message that may include the identification of the requesting mobile device and the requested data service 802. This "access grant" message may be used by the content server whether the requesting mobile device is allowed to receive the requested data service or not. The access control server may extract the identification of the mobile device and the requested service from the access grant message. Using this information, the mobile access control server may determine whether the requesting mobile device is allowed to access the requested data service. The mobile access control server may then send an access grant reply back to the content server indicating whether the mobile device is allowed to access the requested data service 803.

If the access grant reply indicates to the to the content server that the mobile device is not allowed to access the requested data service, the content server may communicate a message to the mobile device indicating that the mobile device is denied access to the requested data service. Further, the content server may not provide its certificate to the mobile device, and the mobile device may not establish a SSL connection with the content server for the requested data service. If, however, the access grant reply indicates to the to the content server that the mobile device is allowed to access the requested data service, the content server may communicate a message to the mobile device indicating that the mobile device is granted access to the requested data service 804. Upon receiving the content server's certificate, the mobile device may store the certificate 506. The other messages exchanged between user interface and mobile device 507, 508, 509, 510 and 511 correspond to those of FIG. 5.

Figure 9:
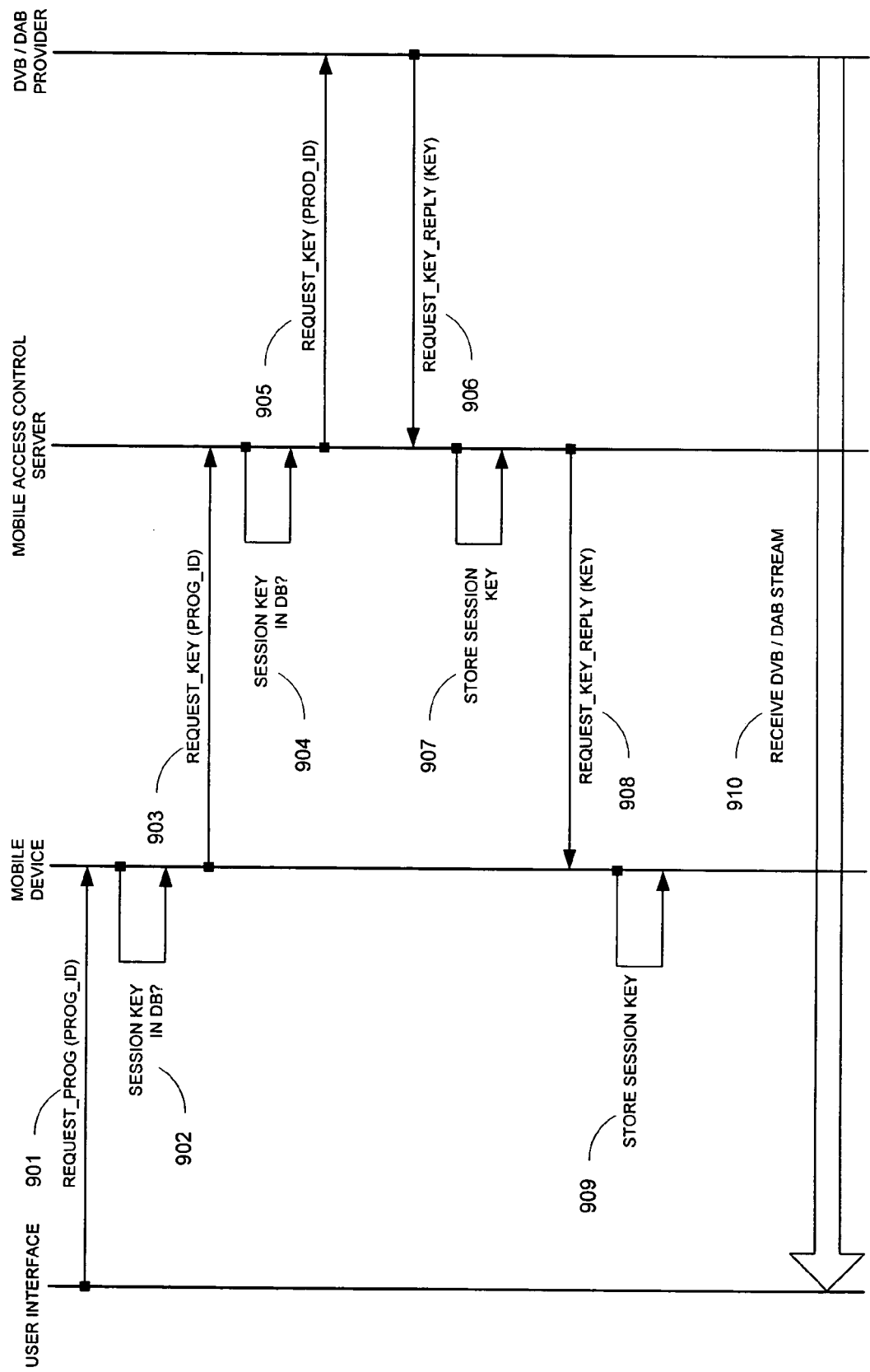
FIG. 9 is a diagram of message flows among the components of the networked system shown in FIG. 2 during a situation in which a mobile device requests permission from a user to establish an EM link with an access provider.

Another message flow that may result when a mobile device makes an access request for a data service from the mobile access control server is shown in FIG. 9. A session key for an encrypted DVB/DAB program may be obtained in a manner similar to that shown in FIG. 8. However, in the example of FIG. 9, the mobile device may request the user's permission to establish an EM link with an access network of an access provider before the mobile device requests the session key for the requested encrypted DVB/DAB program from the DVB/DAB provider. In the manner described in connection with FIG. 8, the DVB/DAB provider may request permission from the mobile access control server to provide the necessary session key to the mobile device.

Figure 10:
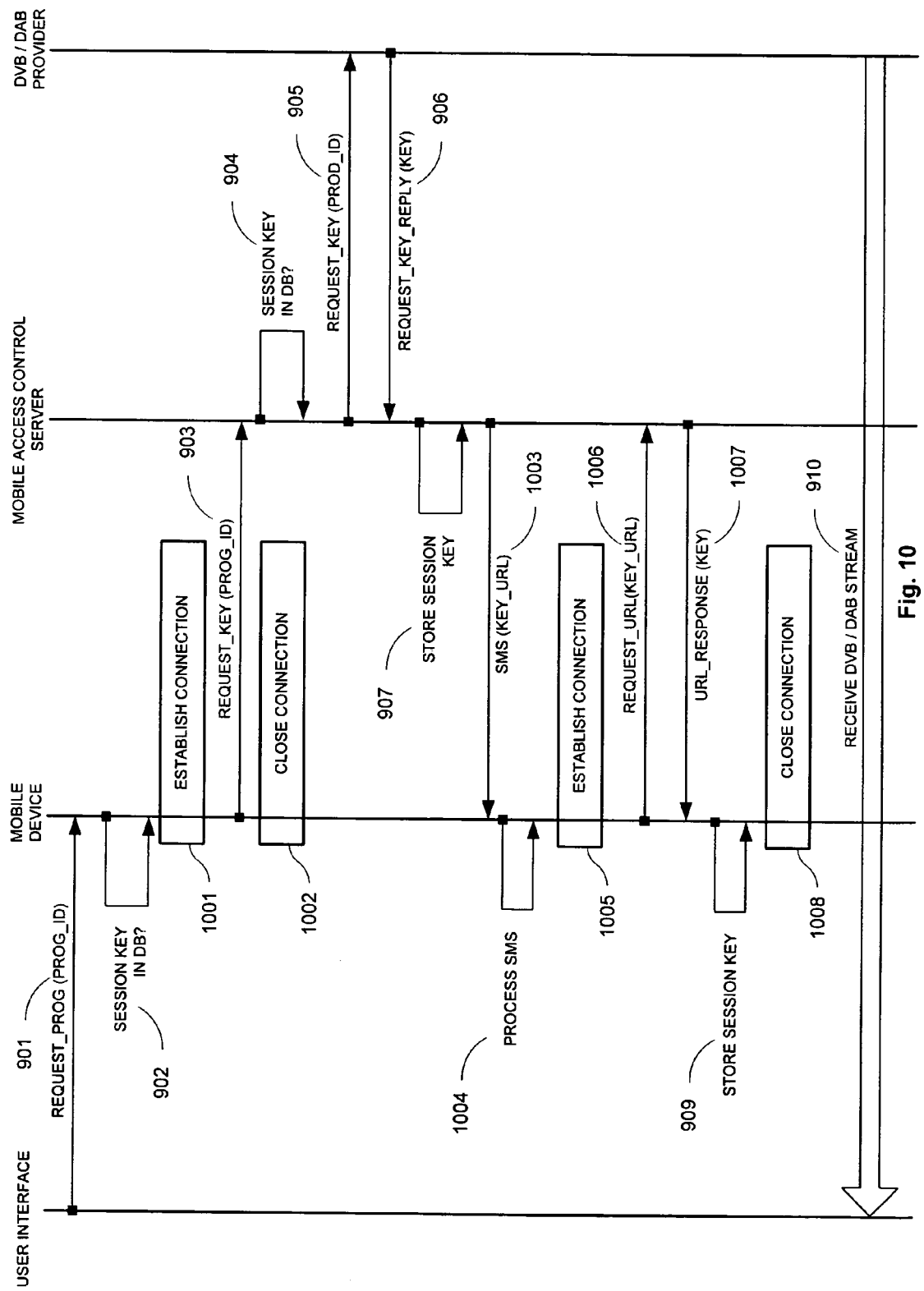
FIG. 10 is a diagram of message flows among the components of the networked system shown in FIG. 2 during a situation in which a mobile device may not maintain constant communication with a mobile access control server.
Figure 11:
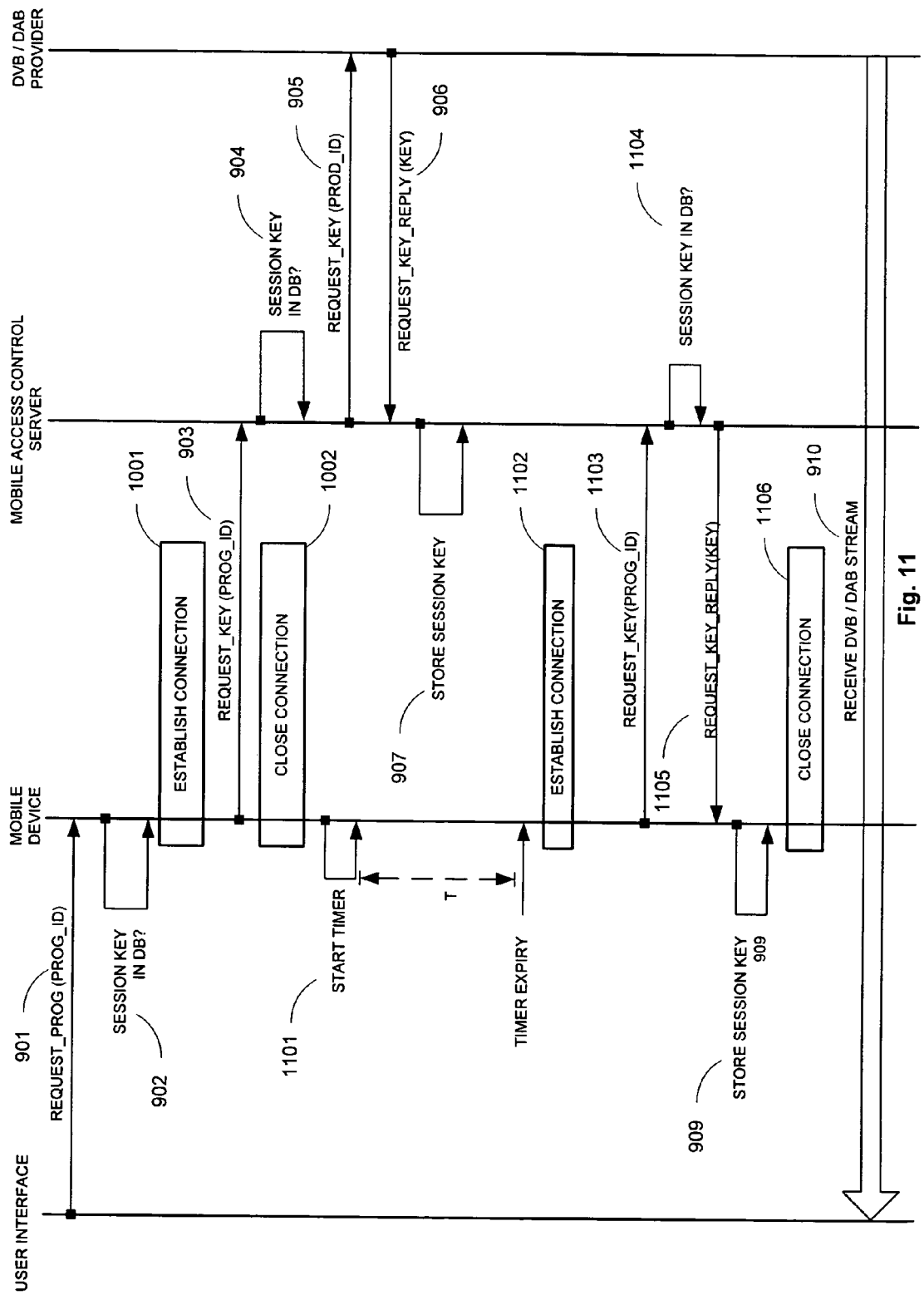
FIG. 11 is a diagram of message flows among the components of the networked system shown in FIG. 2 during a situation in which a mobile device establishes communication with a mobile access control server upon expiration of a timer.

The distribution of session keys required to decrypt DAB and/or DVB programs is discussed more closely with reference to FIGS. 9 through 11. FIG. 9 shows a message flow between the different components of a networked system, such as that shown in FIG. 2. In this example, a user using the user interface of the mobile device or the mobile device itself may request a DVB/DAB program 901. The mobile device may determine whether the session key required to decrypt the requested DVB/DAB program (the "prog_ID") is available from the mobile device 902. Further, if the session key is available locally, the mobile device may determine whether the session key has expired. If the session key is locally available and valid, the mobile device may directly receive the DVB/DAB program, and decrypt its data (not shown in FIG. 9). If, however, the required session key is not available from the mobile device or has expired, the mobile device may communicate an access request for the required session key to the mobile access control server 903, which indicates the requested program (for example, includes the prog_ID). Further, the access request may include an identifier ("ID") that uniquely identifies the mobile device.

Upon receiving the access request, the mobile access control server may determine whether the required session key is locally available 904. If the mobile access control server determines that the required session key is locally available, the mobile access control server may communicate a reply message, which may include the session key, to the mobile device 908. However, if the mobile access control server determines that the session key is not locally available, the mobile access control server may communicate a message to the DVB/DAB provider requesting the required session key 905. Upon reception of this message, the DVB/DAB provider may provide the requested session key, which may be identified by a DVB/DAB program identifier included in the request message, to the content server in a reply message 906.

The mobile access control server may store the session key 909 and may forward the session key to the mobile device 908. In turn, the mobile device may store the session key 909 and may restart the user interface as previously explained in connection with FIG. 5. Upon storing the session key, the mobile device may receive the DVB/DAB program and decrypt the program's data stream using the session key 910.

FIG. 10 shows a message flow between the different components of a networked system, such as that shown in FIG. 2. In this example, the session key is provided differently than in the example discussed in connection with FIG. 9. In the example of FIG. 10, the mobile device may not consistently maintain a connection with the mobile access control server during while obtaining the session key. As indicated by messages 1001 and 1002, the mobile device may establish a communication link with an access network of an access provider before communicating an access request for the session key 903. After communicating the access request 903 the mobile device may disconnect the communication link with the access network 1002. This may avoid extra costs imposed by access providers that charge for access on a time-basis.

Because no communication link between the mobile device and the access network exists when the mobile access control server receives a session key 906 or determines that it has a valid session key locally available, the mobile access control server may communicate a separate message to the mobile device through the access network in which information identifying a location within the mobile access control server at which the requested session key may be found. For this purpose, the mobile access control server may communicate an SMS, or MMS message comprising the URL to the mobile device.

Upon receiving the message 906, the mobile device may again establish a communication link with the access network 1005, and may request the session key from the URL provided by the mobile access control server 1006. In response to the request, the mobile access control server may provide the session key to the mobile device 1007. Upon receiving the session key, the mobile device may close the communication link with the access network 1008. The remaining steps correspond to those described with reference to FIGS. 5 and 9, respectively.

FIG. 10 shows a message flow between the different components of a networked system, such as that shown in FIG. 2. In this example, the mobile device includes a timer, which may be used to trigger the establishment of a communication channel with the mobile access control server 1102. This is in contrast to the example described in connection with FIG. 10, in which the mobile access control server pushing a message to the mobile device to inform the mobile device of the availability of access information for the requested DVB/DAB program.

In the message flow of FIG. 11, when the timer T expires and a communication channel is established with the mobile access control server 1002, the mobile device may (re)transmit an access request for the session key to the mobile access control server 1103. The access control server may determine whether the session key associated with the DVB/DAB program identifier (prog_ID) provided in the access request is available at the mobile access control server 1104. The timer period T may be chosen to increase the probability that a session key was previously requested 905, obtained from a third source, such as the DVB/DAB provider 906, and stored 907 by the mobile access control server prior to the (re) transmission of the access request 1103. When the timer period T is chosen in this manner, the mobile access control server should have the required session key available when the mobile access control server receives the access request 1103. Nevertheless, the mobile access control server may verify the availability of the session key 1104 and may forward the session key, if locally stored, to the mobile device in a reply message 1105.

If, however, the mobile access control server determines that the session key is not stored at the mobile access control server itself, this determination may be communicated with the mobile device. Upon reception of this negative feedback message, the mobile device may restart the timer T, and may communicate an access request for the session key after the timer T has expired. If the timer is restarted a predetermined number of times, and the session key cannot be obtained from the mobile access control server, the mobile device may assume that the session key is not available, or could not be obtained by the mobile access control server, and may communicate this information in an error message to the user. Alternatively or additionally, when the mobile access control server sends the negative feedback to the mobile device, the mobile access control server may communicate a reason for the failure to obtain a session key. The mobile device may then communicate this information to the user.

The principles described with reference to the various Figures may be applied to obtain access information in any form, such as certificates or session keys. In order to allow the mobile device to establish a new communication link and obtain the access information from a specified location on the mobile access control server, the mobile device may obtain certificates from the mobile access control server in a manner similar to using a message to inform the mobile device of the availability of access information on the mobile access control server. Further, a timer may be employed in a similar manner to (re)establish a communication link between the mobile device and the mobile access control server, and to obtain access information in form of certificates from an identified location in the mobile access control server. Also, a manner similar to that described in connection with FIG. 8 may be implemented to obtain a session key from the content provider, such as a DVB/DAB provider.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for controlling mobile access to a data service in a system comprising a mobile device, a content server providing the data service using data in encrypted form, and an access control server, the method comprising:

the mobile device requesting access to the data service at the access control server, the mobile device starting a timer upon requesting access to the data;

the access control server determining whether the mobile device is allowed to access the data service;

if the access control server has determined that the mobile device is allowed to access the data service, the access control server providing access information related to the data service to the mobile device, wherein the mobile device uses the access information to access the data service, wherein providing access information related to the data service to the mobile device further includes the mobile device requesting the access information from the access control server upon expiry of the timer; and if the access control server has determined that the mobile device is not allowed to access the data service, the access control server initiates a subscription process for allowing the mobile device to subscribe to the data service.

2. The method of claim 1, further comprising the mobile device receiving the data service from the content server using the access information received from the access control server.

3. The method of claim 1, further comprising the mobile device establishing an encrypted connection with the content server using the access information received from the access control server, and exchanging encrypted connection data related to the data service with the content server.

4. The method of claim 1, further comprising the mobile device determining whether the access information is stored in the mobile device, and if the access information is stored in the mobile device, accessing the data service using the access information.

5. The method of claims 1, further comprising the access control server determining whether the access information is stored at the access control server, and if the access information is not stored at the access control server, requesting the access information from the content server.

6. The method of claim 5, farther comprising the access control server receiving and storing the access information received from the content server.

7. The method of claim 1, further comprising the access control server determining whether the access information is stored at the access control server, and if the access information is not stored at the access control server, requesting the access information from a certificate authority.

8. The method of claim 7, further comprising the access control server receiving and storing the access information received from the certificate authority.

9. The method of claim 1, wherein the access control server providing access information related to the data service to the mobile device comprises transmitting a message from the access control server to the mobile device indicating a location at the access control server from which the access information may be obtained by the mobile device.

10. The method of claim 9, wherein providing access information to the mobile device further comprises:
the mobile device requesting the access information from the access control server at the location indicated in the message, and
the access control server transmitting the access information to the mobile device.

11. The method of claim 1, wherein the mobile device requesting access to the data service includes the mobile device communicating an access request that includes the data service to which access is requested.

12. The method of claim 1, wherein the mobile device requesting access to the data service includes the mobile device communicating an access request that includes an identifier that uniquely identifies the mobile device.

13. The method of claim 1, wherein the access information includes a certificate.

14. The method of claim 1, wherein the data service includes an encrypted broadcast service.

15. The method of claim 14, wherein the access information is a session key, and the mobile device uses the session key to decrypt the encrypted broadcast service.

16. The method of claim 1, further comprising providing the data service to a user of the mobile device via a browser application.

17. The method of claim 16, further comprising the mobile device storing the access information in a memory.

18. The method of claim 17, further comprising restarting the browser application upon storing the access information in the memory.

19. The method of claim 1, where the access control server is configured to determine whether the mobile device is permitted to access the data service based on a timer, where the access request by the mobile device triggers the timer, further where an expiration of the timer results in a second access request to the data service.

20. The method of claim 1, wherein the access control server determines whether the mobile device is allowed to access the data service based on an identifier uniquely identifying the mobile device.

21. The method of claim 1, wherein the mobile device accesses the system via an electromagnetic link.

* * * * *